(12) United States Patent
Cowan et al.

(10) Patent No.: US 8,396,963 B2
(45) Date of Patent: Mar. 12, 2013

(54) NETWORKED DEVICES FOR MONITORING UTILITY USAGE AND METHODS OF USING THE SAME

(75) Inventors: Peter Cowan, Victoria (CA); David P. Anderson, Victoria (CA); Gregory A. Thompson, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 211 days.

(21) Appl. No.: 12/893,134

(22) Filed: Sep. 29, 2010

(65) Prior Publication Data

US 2012/0079096 A1    Mar. 29, 2012

(51) Int. Cl.
*G06F 15/173* (2006.01)
*G06F 15/177* (2006.01)

(52) U.S. Cl. .................. 709/224; 709/220; 709/221

(58) Field of Classification Search .................. None
See application file for complete search history.

(56) References Cited

U.S. PATENT DOCUMENTS

| | | | |
|---|---|---|---|
| 5,745,669 A | 4/1998 | Hugard et al. | |
| 5,765,221 A | 6/1998 | Rossbach et al. | |
| 6,381,682 B2 | 4/2002 | Noel et al. | |
| 6,519,762 B1 | 2/2003 | Colligan et al. | |
| 6,816,947 B1 | 11/2004 | Huffman | |
| 6,845,464 B2 | 1/2005 | Gold | |
| 6,915,402 B2 | 7/2005 | Wilson et al. | |
| 7,093,097 B2 | 8/2006 | Herr et al. | |
| 7,272,518 B2 | 9/2007 | Bickel et al. | |
| 7,350,020 B2 | 3/2008 | Kanekar et al. | |
| 7,522,639 B1 | 4/2009 | Katz | |
| 7,639,129 B2 | 12/2009 | Bickel et al. | |
| 2004/0064556 A1 | 4/2004 | Zhang | |
| 2006/0041619 A1 | 2/2006 | Gusler et al. | |
| 2006/0136903 A1 | 6/2006 | Childress | |
| 2008/0034004 A1 | 2/2008 | Cisler | |
| 2009/0058635 A1* | 3/2009 | LaLonde et al. | 340/539.11 |
| 2009/0327483 A1 | 12/2009 | Thompson et al. | |
| 2010/0031076 A1 | 2/2010 | Wan et al. | |

FOREIGN PATENT DOCUMENTS

WO    WO 2008/058823    5/2008

OTHER PUBLICATIONS

Raid—http://en.wikipedia.org/wiki/RAID, 1 page, dated Nov. 29, 2010.
International Search Report corresponding to co-pending International Patent Application Serial No. PCT/US2011/053606, United States Patent Office, dated Feb. 16, 2012; (6 pages).
International Written Opinion corresponding to co-pending International Patent Application Serial No. PCT/US2011/053606, United States Patent Office, dated Feb. 16, 2012; (8 pages).

* cited by examiner

*Primary Examiner* — John B. Walsh
(74) *Attorney, Agent, or Firm* — Nixon Peabody LLP (57) ABSTRACT

Systems, methods, and devices are presented herein for monitoring usage of at least one utility by a utility consuming system. One aspect of the present disclosure is directed to a method of managing information in a utility monitoring system that includes a host computer and an array of monitoring devices operatively coupled together on a peer-to-peer network. The array of monitoring devices includes first and second monitoring devices each with a respective memory. The first and second monitoring devices are configured to receive and transmit data. The method includes: storing data received by the first monitoring device in the first memory; storing data received by the second monitoring device in the second memory; responsive to the first memory being below a threshold storage capacity, transferring data received by the second monitoring device to the first monitoring device; and storing the transferred data in the first memory.

28 Claims, 4 Drawing Sheets

NETWORKED DEVICES FOR MONITORING UTILITY USAGE AND METHODS OF USING THE SAME

FIELD OF THE INVENTION

The present invention relates generally to utility distribution and utility monitoring systems. More particularly, the present invention relates to networked devices for monitoring utility usage and methods for using the same.

BACKGROUND

Conventional utility networks supply utilities for commercial, residential and industrial purposes. Regularly supplied utilities include, for example, water, air, gas, electricity, and steam, which are collectively designated by the acronym WAGES. In a typical electrical distribution system, for example, electrical energy is generated by an electrical supplier or utility company and distributed to consumers via a power distribution network. The power distribution network is often a network of electrical distribution wires (more commonly known as "electrical transmission lines") which link the electrical supplier to its consumers. Additional devices, such as bus bars, switches (e.g., breakers or disconnectors), power transformers, and instrument transformers, which are typically arranged in switch yards and/or bays, are automated for controlling, protecting, measuring, and monitoring substations.

Typically, electricity from a utility is fed from a primary station over a distribution cable to several local substations. At the local substations, the supply is transformed by distribution transformers from a relatively high voltage on the distributor cable to a lower voltage at which it is supplied to the end consumer. From the local substations, the power is provided to industrial users over a distributed power network that supplies power to various loads. Such loads may include, for example, various power machines, lighting systems, HVAC systems, security systems, etc.

Within many power distribution networks, monitoring devices are being incorporated into more sophisticated and complex monitoring systems. Such devices include revenue meters, power quality meters, protection relays, programmable logic controllers, remote terminal units, contactors, cameras, etc. Monitoring systems often include devices installed at key points within the system's architecture for monitoring and/or protection of various loads, generators, substations, mains, etc. No longer stand-alone, many embedded electrical devices work in conjunction with other devices (hardware and/or software) and associated equipment.

While utilizing device interconnectivity and complexity can reduce work effort and minimize operating costs, it can also present certain problems. The impact of such problems is best appreciated by first understanding the overall time and effort required to setup such a system during the commissioning of the system. System commissioning, wherein all of the devices and components are installed, configured, and setup to operate, is generally very complex, time consuming, and expensive. Traditionally, many, if not all, of the devices must be individually configured with information that is relevant to the user's needs for the specific point within the system architecture where this device is installed. By way of example, the device may be configured to note it is connected to a feeder, generator, service entrance, or other subcomponent. In addition, the device may contain a notation of the type of measurement being taken, the communication protocols being used, the internet protocol (IP) address and/or other associated configurations, the trip setpoints and curves for a protection relay, etc. Moreover, each device may have custom firmware or special notations from the end user that are noted during the commissioning process. Often, these devices are also configured to connect to a software monitoring package, such as, for example, Building Automation Control Software or Energy Management Software.

With the reduction of analog and mechanical counters, many energy devices now digitally measure the monitoring and protection information, and store such information locally on the device itself. Generally, the more information that can be collected and stored, the more useful that compilation of information is for subsequent analysis. In some cases, the information is stored (or "logged") and later accessed and transferred by the user; in other cases, the information is transferred over a network to a software monitoring package or system. In both cases, however, there are limitations on the device (physical device or software) when the logged data fills the local memory (storage capacity).

In some cases, a piece of hardware or software in the system may fail. For instance, a specific hardware device could break down, which generally requires a new device be commissioned and configured to have the same characteristics as the failed device. This typically requires downtime of the power system, or significant sections thereof, while the new device is manually installed and setup. This can be very costly to the user as downtime of an electrical system could equate to penalties from their customers, loss of production and, thus, loss of profit, etc.

It is also problematic when a device is logging information, but the device memory (storage capacity) becomes full. If there is no alternative way to transfer or otherwise store the data, the subsequently collected information can be lost. This can be costly, as the lost information can be critical to the user if, for example, such information is billing data on a revenue based meter. Simply adding more memory space (storage capacity) to the device does not always solve the foregoing problem, particularly when the added memory in some devices is not fully utilized. By way of example, in cases where there is a huge trip or sag/swell/transient in the system, the corresponding device or devices will do high speed logging of the event, which can use a considerable amount of device memory. It is difficult to predict which device will capture such unpredictable events; thus, the added memory of some devices will remain mostly unused, and just record simple interval data or other information on a regular basis (e.g., every 15 minutes). Moreover, if such an event never occurs, the extra logging memory is wasted. In addition, adding more memory space across all devices in the system can be very expensive, as this will typically require service personnel to implement, and possibly a device being placed out of commission. As well, different devices in the system may be commissioned with complex frameworks or firmware, which in turn uses up more memory and processing power. In general, the actual "free" memory for a particular device is not accurately known until the device is commissioned and installed.

It is also a problem when the system's monitoring software fails. In this case, the interconnectivity and partial setup information of the networked devices can be lost with the software failure. This may require the entire system be re-commissioned. Although a one-time job, the re-commissioning of such devices can last up to a week for small projects, whereas for larger projects it could last many months or even up to a year. As previously mentioned, downtime of this nature due to failure of a working system can be catastrophic for a user.

SUMMARY

In some embodiments of the present disclosure, the above-mentioned deficiencies are solved by a system configuration that distributes memory (storage capacity) usage over a networked system of devices and stores logged data more efficiently and effectively. In some embodiments, one or more of the individual devices store system configuration and commissioning information, whereby this localized information enables more simplified and expeditious device restoration with configuration, commission and logged data at the device level. According to additional aspects of the present disclosure, one or more of the above-mentioned deficiencies are solved by a system that maximizes the utilization of resources for information and data storing. This can be very beneficial since the interconnectivity of the system is often stored or saved on the monitoring system software; thus, the larger the system gets the more difficult it would otherwise be to configure, organize, and operate the system.

According to one embodiment of the present disclosure, a method of managing information in a utility monitoring system is presented. The utility monitoring system includes a host computer and an array of monitoring devices operatively coupled together on a peer-to-peer network. The monitoring devices include at least a first monitoring device with a first memory and a second monitoring device with a second memory. The first and second monitoring devices are each configured to receive data, convert measurements of a characteristic of a utility into corresponding data, and transmit data. The method includes: storing data received by the first monitoring device in the first memory; storing data received by the second monitoring device in the second memory; responsive to the first memory being below a first threshold storage capacity, transferring at least some of the data received by the second monitoring device to the first monitoring device; and storing the transferred data in the first memory.

Another embodiment of the present disclosure features one or more non-transitory, machine-readable storage media that include instructions which, when executed by one or more processors, cause the one or more processors to perform operations associated with a first monitoring device having a first memory. These operations include: receiving data; storing the received data in the first memory; responsive to a second memory within a second monitoring device being below a threshold storage capacity, transferring at least some of the data received by the first monitoring device to the second monitoring device, the first and second monitoring devices being operatively coupled together on a peer-to-peer network; and instructing the second monitoring device to store the transferred data in the second memory.

According to yet another embodiment of the present disclosure, a monitoring system for monitoring usage of at least one utility by a utility consuming system is disclosed. The monitoring system includes a plurality of monitoring devices each with a respective memory. Each of the monitoring devices is configured to receive data, transmit the received data, and store the received data in their respective memories. A host computer is operatively coupled to the plurality of monitoring devices. A peer-to-peer network communicatively couples the plurality of monitoring devices together. Each of the monitoring devices is operable to selectively transfer at least some of the data received thereby to at least one of the other monitoring devices on the peer-to-peer network. In addition, each of the monitoring devices is operable to selectively store in their respective memory at least some data transferred thereto via one of the other monitoring devices on the peer-to-peer network.

The above summary is not intended to represent each embodiment or every aspect of the present disclosure. Rather, the foregoing summary merely provides an exemplification of some of the novel features included herein. The above features and advantages, and other features and advantages of the present disclosure, will be readily apparent from the following detailed description of the embodiments and best modes for carrying out the present invention when taken in connection with the accompanying drawings and appended claims.

While the present disclosure is susceptible to various modifications and alternative forms, specific embodiments have been shown by way of example in the drawings and will be described in detail below. It should be understood, however, that the present disclosure is not intended to be limited to the particular forms disclosed. Rather, the present disclosure is to cover all modifications, equivalents, and alternatives falling within the spirit and scope of the invention as defined by the appended claims.

DETAILED DESCRIPTION

While aspects of the present disclosure are susceptible of embodiment in many different forms, there are shown in the drawings and will herein be described in detail representative embodiments of the present disclosure with the understanding that the present disclosure is to be considered as an exemplification of the various aspects and principles of the present disclosure, and is not intended to limit the broad aspects of the present disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise.

In some embodiments of the present disclosure, system configurations and methods are presented that distribute memory usage (data storage capacity) over a peer-to-peer system network and store logged data more efficiently and effectively. In some embodiments, one or more of the individual devices store system configuration and commissioning information, whereby this localized information enables more simplified and expeditious device restoration with configuration, commission, and logged data at the device level. In some embodiments, systems and methods are disclosed that maximize the utilization of resources for information and data storing. In some embodiments of the present disclosure, systems and methods are disclosed with monitoring devices that are communicatively coupled together via a peer-to-peer architecture. A memory (storage capacity) utilization scheme is employed where the monitoring devices coordinate amongst themselves how to utilize available memory (data storage capacity) of the devices on the peer-to-peer network without the management of a master or central server.

The transferred and stored information may include, for example, logging data, such as voltage (V), current, which is typically measured in amperes (A), power, which is typically expressed in watts (W), kilo volt-ampere (kVA), kilowatt hours (kWh), power factor, event information, etc. The transferred and stored information may likewise include, for example, commissioning & configuration information, such as current transformer/potential transformer (CT/PT) ratio setup, voltage and current polarity setup, form factor and wiring setup, communication setup (e.g., communication protocols, baud rates, transmit delays, unit ID's for networks, etc.), security controls (e.g., passwords, timesync sources, web and firewall access, etc.), database and network & server configurations (e.g., IP Address, Subnet mask, Gateway, DNS, etc.), device names, Power Quality Setups (e.g., Sag/Swell limits, event priority, etc.), format setups (e.g., display options for values and dates), one-line-diagram information, and other general setup options. Additionally, during the commissioning process, other information, such as customer or anecdotal information related to that specific setup can be included.

There are various scenarios where aspects of the present disclosure are especially useful. One such instance is when a specific monitoring device needs to be replaced, for example, due to planned asset replacement or unplanned failure of the device. In this example, key data and configuration information previously stored on the replaced device needs to be entered and stored within the replacement device. Various aspects of the present disclosure allow the reconfiguration of the replacement device to be automated, and provide the possibility of retrieving data from the replaced device that has not been sent to the System Monitoring Software or otherwise saved by the user.

Another situation where aspects of the present disclosure are especially useful is when the monitoring system and/or associated databases need to be replaced, whether planned or unplanned. According to embodiments of the present disclosure, reconfiguration of the new monitoring system is automated, and the possibility of restoring the system to its original setup is not only available, but the process thereof is simplified and expedited.

Another instance where aspects of the present disclosure are especially useful is when the monitoring system is tied to an internet-hosted remote storage system that captures data collected by various monitoring devices, and makes the data available through web-based services for data analysis and reporting. This includes supporting monitoring devices when they are at maximum storage capacity and/or maximum processing capacity but still need a system to help capture and process monitoring or measurement data for the user without losing data.

In another example, aspects of the present disclosure are especially useful during steady-state operation of a device-based peer-to-peer monitoring and control solution. For relatively simple monitoring and control systems where no application software is desired/present and collective functions of the devices determine the features of the system, all historical and event-based data provided to the end user is stored within the devices themselves and not transferred to any other application. The ability to maximize the collective memory of the devices within the system lowers capital expenditures and minimizes operating expenditures for the end users.

Figure 1:
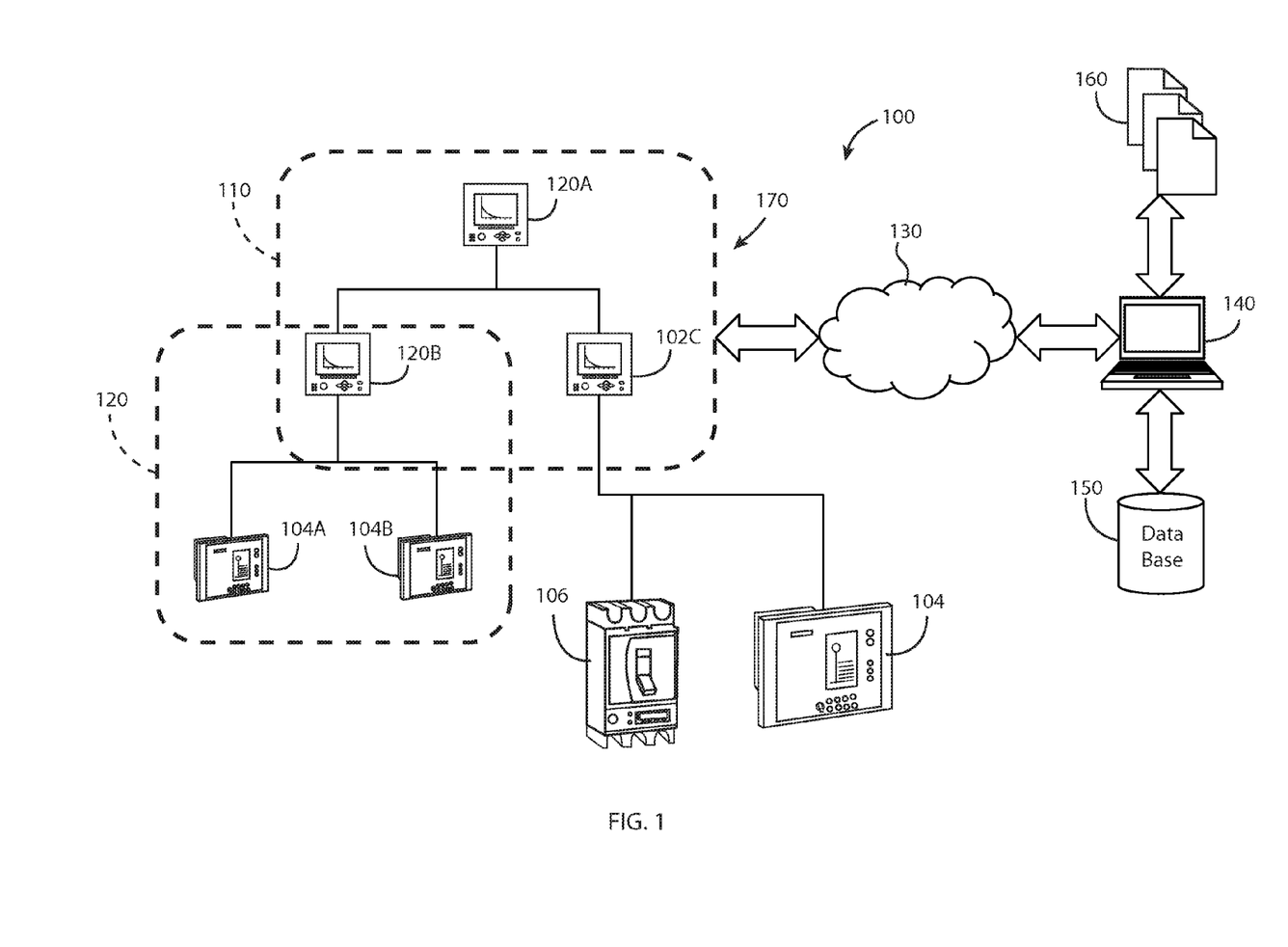
FIG. 1 is a schematic illustration of an exemplary utility monitoring system according to aspects of the various embodiments disclosed herein.

Referring to the drawings, wherein like reference numerals refer to like components throughout the several views, FIG. 1 schematically illustrates an exemplary utility monitoring system, designated generally as 100. The utility monitoring system 100 illustrated in FIG. 1 is comprised of various electronic devices 102, 104 and 106. An advantage of the present concepts, which will become more readily apparent from the discussion below, is that the devices 102, 104, 106 can all be different, can all be the same, or any variance therebetween. For instance, the devices 102, 104, 106, singly, collectively, or in combination, may include meter devices that capture and record measurements and monitor power quality, such as, for example, revenue meters, programmable logic controllers, remote terminal units, contactors (e.g., on/off data), cameras (e.g., providing electronic surveillance), etc. The devices 102, 104, 106 may also include protection relay devices, such as overcurrent relays, distance relay, current differential relays, etc., that protect and control the monitoring system 100.

A monitoring device is, in some embodiments, an apparatus with the ability to sample, collect, and/or measure one or more characteristics or parameters of a utility system. By way of non-limiting example, the monitoring devices 102, 104, 106, singly, collectively, or in combination, may be a PowerLogic® CM4000T Circuit Monitor, a PowerLogic® Series 3000/4000 Circuit Monitor, or a PowerLogic® ION7550/7650 Power and Energy Meter available from Square D Company of Canton, Mass. A monitoring device is, in some embodiments, an Intelligent Electronic Device (IED). The IED may be a microprocessor-based controller that is operable to receive data from sensors (e.g., optical sensors, thermal sensors, acoustic sensors, capacitive sensors, etc.), monitoring devices, power equipment, and/or other sources of information, and issue control commands, such as tripping circuit breakers or switching capacitor bank connectivity, if voltage, current, or frequency anomalies are sensed. By way of non-limiting example, the IED can be based on the PowerLogic® CM3000/CM4000 Series Circuit Monitor, the PowerLogic® PM700 and 800 Series Power-Monitoring Units, or the PowerLogic® ION 7550/7650 Series Power and Energy Meter, all of which are available from Schneider Electric. In addition, various IED devices and method of use are described in detail in U.S. Pat. No. 6,671,635, to J. Bradford Forth et al., entitled "Systems for Improved Monitoring Accuracy of Intelligent Electronic Devices," U.S. Pat. No. 6,687,627, to Colin N. Gunn et al., entitled "Electric Charge Storage Apparatus and Method for an Intelligent Electronic Device," and U.S. Pat. No. 6,792,337, to Andrew W. Blackett et al., entitled "Method and System for Master Slave Protocol Communication in an Intelligent Electronic Device," all of which are incorporated herein by reference in their respective entireties.

Although the utility monitoring system 100 shown in FIG. 1 is a power monitoring system, aspects of the present disclosure are not limited to power monitoring systems. Rather, various aspects of the present disclosure are applicable to any system that monitors any characteristic of utilities, such as those commonly designated by the acronym WAGES, which stands for Water, Air, Gas, Electricity, or Steam. The utility monitoring systems include monitoring devices that measure a flow of a utility, and those measured values are referred to herein as a "utility usage rate." Non-limiting examples of a utility usage rate or "UUR" include: kilowatts (kW), kVAr (kilovolt-ampere reactive or reactance), therms (thm) per unit time (such as per hour or per day), pounds-per-square-inch (PSI) per unit time, hundred cubic feet (CCF) per unit time (e.g., per hour or per day), pounds per unit time (e.g., per hour or per day), and gallons per unit time (e.g., per hour or per day). It should be understood that although specific aspects are described below with reference to a power monitoring system, other aspects of the various embodiments include a utility monitoring system that includes utility monitoring devices that measure characteristics of a WAGES utility.

The devices 102, 104, 106 are communicatively coupled together over a peer-to-peer network, designated generally as 170. A peer-to-peer (P2P) network is often characterized as a distributed application architecture that partitions tasks, responsibilities, and/or workloads, generally equally, between the various devices connected to the network, known as "peers" or "P2P nodes." Each peer typically makes a portion of its resources, such as processing power, disk storage, or network bandwidth, directly available to other network participants, without the need for central coordination or management by servers or hosts. In contrast to a traditional client-server model where servers supply and clients consume, peers are both suppliers and consumers of resources. A detailed discussion of peer-to-peer networks is provided by Rüdiger Schollmeier in "A Definition of Peer-to-Peer Networking for the Classification of Peer-to-Peer Architectures and Applications," Proceedings of the First International Conference on Peer-to-Peer Computing, IEEE (2002), which is incorporated herein by reference in its entirety.

A user interface, such as host computer 140, is operatively coupled to the monitoring devices 102, 104, 106, for example, via communication network 130. The host computer 140 may also be coupled to a database 150. In another aspect, the host computer 170 is a standalone computer and receives data from one or more electronic files 160, which may also be inputted into or extracted from the database 150. In some applications, the monitoring devices 102, 104, 106 of FIG. 1 monitor system parameters and characteristics, such as demand usage, and transmit this data over the communication network 130 at periodic (or aperiodic) intervals with appropriate date- and time-stamping information. Alternately, the data can be extracted manually from the monitoring devices 102, 104, 106 and provided to the host computer 140 via the files 160. In various optional aspects, the data base 150 and/or data files 160 are integrated into the monitoring devices 102, 104, 106. The communication network 130 can be wired (e.g., Ethernet, RS485, etc.), wireless (Wi-Fi, Zigbee, cellular, Bluetooth, etc.), or interconnected via other known and yet to be developed means of communication.

The utility monitoring system 100 also includes monitoring software that monitors and controls the monitoring devices 102, 104, 106. According to some aspects, the monitoring software communicates with the monitoring devices 102, 104, 106, acquiring data and further processing, storing, and presenting the data to one or more system users. It also allows connection and control of the Protection Relays and other associated devices on the Electrical System. Two exemplary Energy Management software packages that can be used for accumulating and organizing data is the PowerLogic® ION® Enterprise software package and the ION® EEM software package, both of which are available from Schneider Electric (formerly Power Measurement Ltd.) of Saanichton, B.C. Canada. Other supervisory control and data acquisition (SCADA) software applications can also be utilized without departing from the scope and spirit of the present disclosure.

The utility monitoring system 100 illustrated in FIG. 1 is shown having seven electronic devices 102, 104, 106; however, the monitoring system 100 may comprise greater or fewer devices than that shown in FIG. 1. At a minimum, the array of monitoring devices 102, 104, 106 includes at least two monitoring devices, each with a respective localized memory, and each configured to receive data and transmit the received data. According to aspects of the present disclosure, the memory in each device 102, 104, 106 is set to store and share information, such as commissioning & configuration information and logging data, with itself and other surrounding devices, thus enabling a backup of such information within the system itself. Some embodiments utilize cloud based computing as an alternate for the data redundancy; however, utilizing only the peer-to-peer networked devices mitigates individual device limitations without the explicit need for cloud computing.

With continuing reference to FIG. 1, many of the monitoring devices are shown segregated into "clusters" of peer-to-peer networked devices. The first informal cluster 110 is illustrated in FIG. 1 comprising three devices: an energy meter device 102A coupled to two downstream meters 102B and 102C. In a similar regard, the second informal cluster 120 is shown comprising three devices: an energy meter 102B coupled to two downstream devices 104A and 104B. One of the downstream meters 102C in the first cluster 110 is also connected to two "non-clustered" devices 104 and 106.

In some configurations, the upstream devices in each cluster 110, 120 passes information downstream. For instance, the energy meter device 102A passes commissioning & configuration data to the two downstream devices 102B and 102C for storage therein, while the device 102C passes configuration & commissioning data to the two downstream devices 104A and 104B for storage therein. According to some optional configurations, each of the devices in each cluster 110, 120 stores information, such as configuration and commissioning data and/or logging data, for the various other devices in the cluster. Likewise, the downstream devices in each cluster 110, 120 may pass information upstream. These arrangements allow for data redundancy of each "informal cluster" or ad-hock cluster. A benefit of each cluster is it does not require a pre-existing or planned infrastructure; rather, the clusters can be dynamically determined based on the connectivity of the devices on the network. For instance, in some embodiments, each cluster comprises selected ones of the monitoring devices on the peer-to-peer network, and the selected devices associated with a particular cluster can be dynamically determined, for example, based on the interconnectivity (i.e., architecture) of the array of peer-to-peer networked devices.

It can be appreciated that the more clusters there are in the utility monitoring system 100, or the deeper into a cluster level that data redundancy is setup, the more memory (i.e., information storage capacity) that can be effectively utilized by the devices in the system 100. Thus, in one embodiment, the user or system 100 may set the tolerance for the level or direction of data redundancy—e.g., only save commissioning & configuration to upstream devices, downstream devices, both upstream and downstream devices, or upstream/downstream more than 1 level of devices Likewise the user or system 100 can set the amount of data and/or type of data made redundant—e.g., critical commissioning & configuration data only, selected fields, all data, etc.

The commissioning & configuration data redundancy presented above is beneficial to the user in instances when a device must be removed from the system because a new device can be installed and immediately be configured to search the devices in its cluster in order to locate, transfer, and load the necessary commissioning & configuration data.

Automation of this process removes a large portion, if not all, of the time and effort needed for the user to re-commission and setup the new/replacement device in an existing system.

It can be appreciated that the commissioning & configuration data can also be stored on the above-mentioned monitoring software, and then be pushed to the new/replacement device. However, the device based data redundancy presented above is beneficial because it moves the redundancy to the device level, and therefore does not actively require communications to the monitoring software setup. This is advantageous because there may be occasions where little or no communication is available with the monitoring software, or the communication network may be too loaded to transfer the information in a timely manner. In addition, the device based data redundancy removes the need to actively utilize a secondary server for backup data of the monitoring software.

There are a variety of manners in which the commissioning & configuration data can be packaged and sent, as well as searched. For example, a master/slave approach can be used to exchange data, where one member of each cluster is designated the master. In another example, a peer-to-peer approach can be used, as described above. Commissioning & configuration data can be packaged much like a file or piece of data. By way of illustration, every data packet can contain at least a Device ID, which indicates, for example, where the device is located in the system, what parameters/characteristics are being monitored by the device at that location, what commissioning & configuration information is needed for the device at that location, other relevant information, or any combination thereof. During reconfiguration when a new device is added to the system 100, the new device will require at least the Device ID so it can request (or wait to be pushed) the necessary backup data. Only backup data that contains the same Device ID will be used for reconfiguration.

According to some aspects of the present disclosure, the commissioning & configuration data redundancy contains information of the Single Line Diagram. A Single Line Diagram, which is also known as a "One-Line Diagram," is a simplified way of characterizing an electrical system, such as a three phase power system. Typically in the nature of a schematic diagram, the Single Line Diagram graphically depicts the paths for power flow between constituent parts of the electrical system. A Single Line Diagram employs simplified notations, usually standardized schematic symbols, for the constituent elements of the electrical system, such as circuit breakers, capacitors, protection relays, loads, generators, etc. Historically, Single Line Diagram information was not part of the commissioning & configuration data. In some instances, the Single Line Diagram is stored and utilized separately in the system's monitoring software. Often, one-line diagrams are manually generated, but some technologies have emerged that will automate this process. For example, U.S. Pat. No. 7,639,129 B2, to Jon A. Bickel et al., which issued on Dec. 29, 2009 and is entitled "Automated Configuration of a Power Monitoring System using Hierarchical Context," and U.S. Pat. No. 7,272,518 B2, to Jon A. Bickel et al., which issued on Sep. 18, 2007 and is entitled "Automated Hierarchy Classification in Utility Monitoring Systems," each of which is incorporated herein by reference in their respective entireties, provide discussions of systems and methods for automating the generation of one-line diagrams. According to aspects of the various embodiments disclosed herein, one or more or all of the device-level components (e.g., devices 102, 104, 106 of FIG. 1) in the system 100 contains the necessary data, such as respective environment information, which would enable the quick pseudo-automated generation or regeneration of a Single Line Diagram.

By way of example, and not limitation, each device can store a contextual environmental/installation notation for the device—e.g., "7500 energy meter connected to Feeder A, Building M." or "PM800 240V Monitoring Point A", upstream/downstream location of each device, etc., which would enable the user or system to quickly create or recreate the Single Line Diagram.

Having the Single Line Diagram stored at the device level, which is then available for comparison against a Single Line Diagram stored, for example, by the monitoring software, allows the user to ensure the monitoring system is functioning properly as dramatic changes in the electrical system and/or monitoring system can be flagged and the end-user can be notified. This is enabled by the Single Line Diagram reference that is stored by the monitoring software and the reference information stored on the devices themselves which can then be contrasted or otherwise analyzed to identify any (major) differences. This would enable the system to alert the user and allow the user to take preventative measures, such as reconfiguring the system (i.e., protection relay coordination settings).

In the description and claims, the use of the term "memory" is generally referring to storage capacity for data and information, and should not otherwise be construed as overly limiting. Use of the term "memory" is not intended to be limited to short-term (volatile) memory or long-term (non-volatile) memory or any variations thereof.

Figure 2:
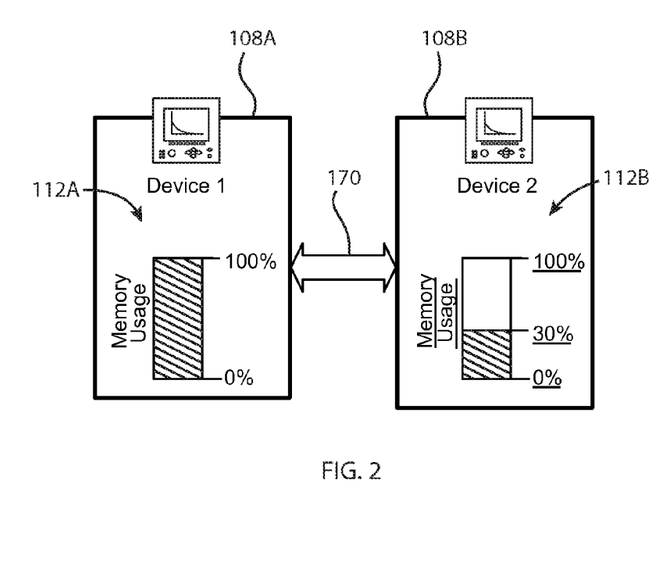
FIG. 2 is a schematic illustration of a first exemplary monitoring device transmitting information over a network to a second exemplary monitoring device according to aspects of the various embodiments disclosed herein.

FIG. 2 is a schematic illustration of an exemplary monitoring device 108A transmitting information over a peer-to-peer network 170 to another exemplary monitoring device 108B for storage therein. Each of the networked monitoring devices 108A, 108B includes a respective memory 112A and 112B, and is operable to receive data, store received data, and transmit data. FIG. 2 shows that there will be times with the distributed memory platform when the memory in one device will prematurely reach its storage capacity (100%) or otherwise exceed a threshold storage capacity (e.g., %92 with the remaining 8% being dedicated to other uses). This lack of free memory (storage capacity) can occur when the memory of one device becomes full, for example, due to the amount of logged data and/or the number of applications it has stored on it to run, while another device coupled to the network may have more physical memory, less logged data, and/or less applications stored.

While downloading subsequently received data to the monitoring software may be a possible solution to this issue, there may be times when this option is not available. For instance, as noted earlier, some devices will not have communication capabilities with the monitoring software, or communication with the monitoring software may be interrupted. Furthermore, the monitoring software may become corrupt or the database associated with the monitoring software may become corrupt. In any of the foregoing cases, loss of logged data can be extremely costly to the user.

As an alternative to uploading locally-logged data from a networked energy meter or gateway to the monitoring software and/or database, each device 108A, 108B on the peer-to-peer network 170 can distribute data across the network 170 to those devices with available memory (storage capacity). By way of non-limiting example, data received by the first monitoring device 108A is initially stored in the first memory 112A. Likewise, data received by the second monitoring device 108B is initially stored in the second memory 112B. If the second memory 112B is below a corresponding threshold storage capacity, some or all of the data received by the first monitoring device 108A can be transferred to the second monitoring device 108B and stored in the second memory 112B. The transferring of data from the first device 108A to the second device 108B, as seen in FIG. 2, can be passive (e.g., to transfer administrative information), proactive (e.g., in case of a potential future issue with the first device 108A), preventative (e.g., prior to and in anticipation of the first memory being full), or responsive (e.g., after the first memory has reached or exceeded a threshold or maximum storage capacity), or any of the other options disclosed herein, singly or in any combination.

In some embodiments, prior to transferring any data, the first monitoring device 108A can prompt the second monitoring device 108B to determine if the second memory 112B is below the threshold storage capacity. In some embodiments, the second monitoring device 108B can determine if the second memory 112B is below the threshold storage capacity and, if so, emit a signal indicative of the available storage capacity. In some embodiments, if it is determined that the second memory 112B is not below its threshold storage capacity, some or all of the data received by the second monitoring device 108A can be transferred to the first monitoring device 108A for storage in the first memory 112A. Any or all of the devices on the peer-to-peer network can be configured in conjunction with one or more of the features disclosed above.

In the embodiment illustrated in FIG. 2, the combination of the first and second networked devices collectively provide enough storage capacity for storing the required data, even though, individually, the primary device that is tasked with the job does not. The first device 108A is shown in FIG. 2 having reached 100% memory usage or a maximum storage capacity (which may also be considered a threshold storage capacity). Prior to, during, or subsequent to reaching the threshold storage capacity, the first device 108A transfers information to the second device 108B (and one or more other peers on the network) based, for example, on each device's respective available memory space. According to some embodiments of the present disclosure, as the end-user user modifies the parameters being logged by the device and the time frame in which to log those parameters, the device (or, optionally, the system or the user) modifies the distributed storage plan, which may include incorporating other networked devices in the distributed storage plan.

It can also be seen that in place of or in addition to the logged data, the configuration & commissioning data can be shared in a similar manner across multiple devices. Referring back to FIG. 1, for example, the device 102C may be instructed to save configuration & commissioning data, yet may not have enough storage capacity allocated or available to do so. In this example, the device 102C can implement a distributed memory logging feature in conjunction with embodiments of this disclosure, and push the information to the upstream device 102A or another device within the cluster 110, such as meter 102B. In the opposite manner, when the logged data or configuration & commissioning data is requested by an external monitoring application, another device on the network, or the applications within the device itself, the device 102C can reconstruct the data from the distributed memory location(s) and form a single data set.

There are a variety of options available in the distributed storage plan for managing the transfer and storage of information, such as a first-in-first-out (FIFO) method. In one implementation, the FIFO method entails constantly moving older data to the distributed devices and replacing with new data local to the device. In other implementations, the first data transferred to and stored on a network peer will be the first data to be removed from the network peer to make room for more recently transferred information. Another available option would be to be a fill and hold (FAH) method. In one implementation, the FAH method entails automatically routing new data to another device with available memory.

A third available option for managing the transfer and storage of information includes identifying one or more triggering events, where when one of the predetermined triggering events occurs, whether scheduled or unscheduled, the device automatically leverages the available memory/storage space of other devices on the P2P network. For example, the triggering event can be a precursor or other signal that a large amount of data will be received by one of the networked monitoring devices. If the triggering event occurs, at least some of the data being received by these monitoring devices can be distributed or otherwise apportioned among one or more of the devices on the network, and stored thereon. A fourth available option would be a normal "data memory full" method, where an indication that the local memory is full would trigger the device to leverage the available memory/storage space of other devices on the P2P network.

There may be situations where, regardless of the amount of storage space available among the distributed devices in the network (or within individual clusters), the network (or cluster) may still have memory limitations. That is, even when numerous devices in a network or cluster allocate storage space for the distributed memory platform, the total available storage still has a maximum capacity that can be used up. In this case, the user (or, optionally, the system) can set a "hierarchy redundancy of data." This allows the user (or system) to designate certain data fields as critical and, optionally, designate certain fields as not critical. Some implementations will hold critical data fields from deletion when the storage space allocated for the distributed memory platform is used up. Optionally, some implementations will automatically delete non-critical data fields when the storage space allocated for the distributed memory platform is used up. For example, the first data that is typically saved to a device will be commissioning & configuration data. Absent a hierarchy redundancy of data, this can be problematic in a FIFO methods of managing the transfer and storage of information because the first information to be deleted from memory can be the commissioning & configuration data. If, however, the commissioning & configuration data is designated as a critical data field, it will be held from deletion while alternate (non-critical) data is removed to make room for subsequently received information. According to some implementations, the "hierarchy redundancy" of data is established during the commissioning and setup phase of the monitoring system.

In practice, data retrieval can happen in a variety of ways. For example, referring back to FIG. 1, to retrieve data from the first meter device 102A, where overflow is stored in downstream meter 102B, the monitoring software (e.g., via host computer 140) can request the data from meter 102A and from meter 102B via meter 102A. While reassembling the data may be done on meter 102A, it can also be reassembled when it is retrieved. In another example, to retrieve data from the first meter device 102A, where overflow is stored in downstream meter 102B, the monitoring software (e.g., via host computer 140) can request the data from meter 102A, which will push the requested data, and request the data from meter 102B, which will pushes the requested data directly to the host computer 140.

Figure 3:
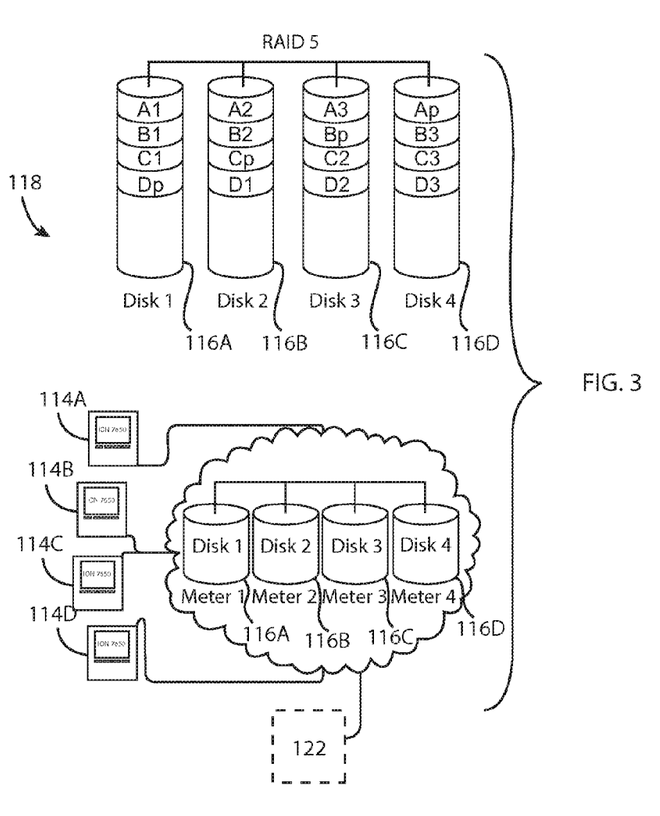
FIG. 3 is a schematic illustration of various exemplary monitoring devices arranged in a RAID array according to aspects of the various embodiments disclosed herein.

In an alternate embodiment, FIG. 3 presents a schematic illustration of four exemplary networked electronic devices—i.e., first, second, third and fourth meters 114A, 114B, 114C and 114D, respectively, arranged in a RAID array, designated generally as 118, according to aspects of various embodiments of this disclosure. RAID is an acronym for redundant array of independent (or inexpensive) disks. The RAID array 118 provides increased storage reliability through redundancy by combining multiple disk drive components into a logical unit where all drives in the array are interdependent. At its simplest form, the RAID array 118 shown in FIG. 3 stores data on more than one drive to ensure no data is inadvertently lost and to allow recovery of data from failed disk drives without shutting the entire monitoring system down. A detailed discussion of RAID arrays is provided by David A. Patterson, Garth Gibson, and Randy H. Katz in "A Case for Redundant Arrays of Inexpensive Disks (RAID)," University of California Berkley (1988), which is incorporated herein by reference in its entirety.

Each meter 114A-114D has corresponding disk drives 116A, 116B, 116C and 116D, respectively, for saving data within localized disk space. To help increase the preservation of data before the data is brought into the monitoring software, there is a redundant data scheme implemented on the meters 114A-114D where they each use available disk space on the other meters via an implemented RAID array. The RAID array 116 is shown in FIG. 3 as a RAID 5 array; however, the networked monitoring devices can be linked together in a RAID 3, a RAID 4, or a RAID 5 type-array, or any combination thereof. Other RAID configurations could also be implemented. A RAID 5 array can be set up between a minimum of 3 meters and offer N−1 storage space (2 log spaces in the event of 3 meters). In the event of a device failure, the data from the failed device would still be stored on one or more of the other meters.

A RAID 5 configuration uses block-level striping with distributed parity. In typical monitoring systems, the storage capacity of each device is utilized individually. By incorporating striping, the system would treat all of the disk space 116A-116D as a single drive. When the system writes data to a disk, the RAID 5 striping automatically distributes data across all of the meters 114A-114D. For example, part of a file (or "chunks of data") will be written to the first disc (e.g., Disk 1 as A1), part of the file will be written to the second disc (e.g., Disk 2 as A2), the next part to the third disc (e.g., Disk 3 as A3), etc. In some instances, the system will then start all over again until the entire contents of the file have been written. An advantage of the foregoing methodology is that it increases the speed of the reading/writing process. Another benefit is that the individual drives can be different sizes. However, in a RAID 5 array requires a minimum of three data-sharing drives, and it is sometimes recommended that these three data-sharing drives be the same size. A RAID controller 122 may also be required.

With distributed parity, the parity may be distributed onto another array. Distributed parity requires all drives but one to be present to operate. Although drive failure will requires replacement, the array is not destroyed by a single drive failure. Upon drive failure, any subsequent reads can be calculated from the distributed parity such that the drive failure is masked from the end user. A single drive failure in the set will result in reduced performance of the entire set until the failed drive has been replaced and rebuilt.

One or more of the devices may be configured to act like a RAID controller, knowing where data is stored and how to retrieve and reassemble the data. This may further require the device be operable to send simple requests to other devices and, if they have failed, implement algorithms on existing data and devices to recreate stored data.

Figure 4:
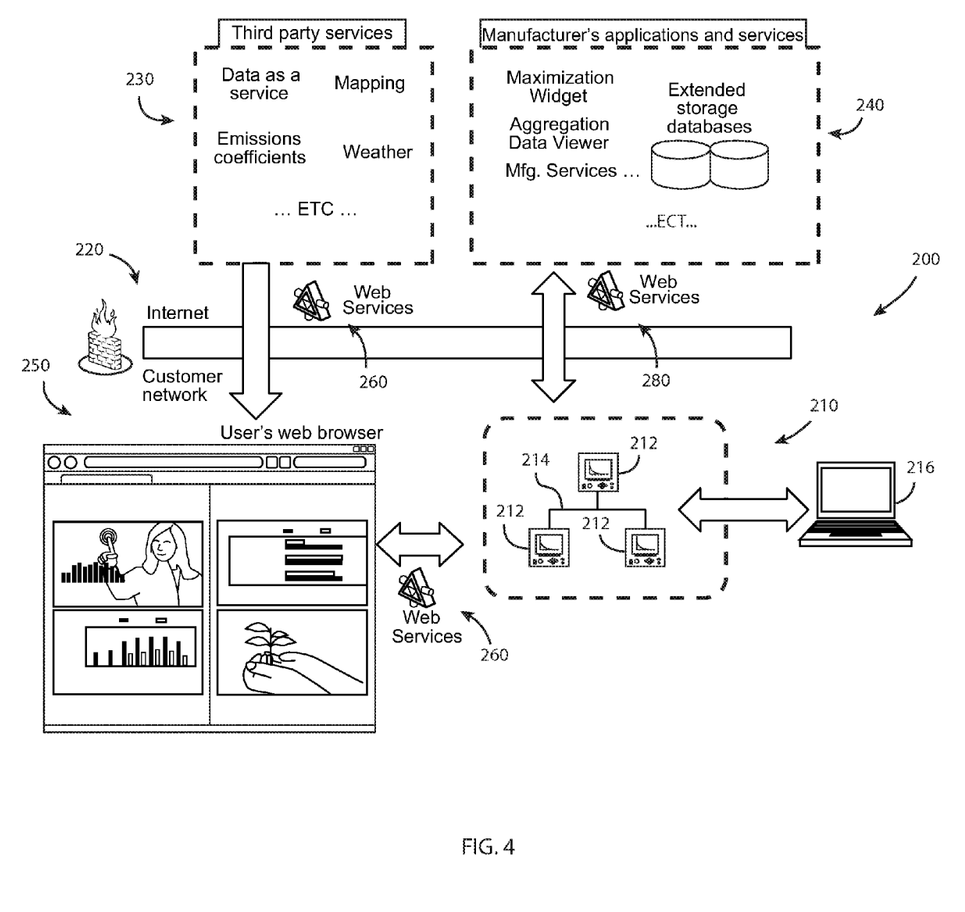
FIG. 4 is an exemplary network system diagram according to aspects of the various embodiments disclosed herein.

FIG. 4 is a diagram of an exemplary network system, designated generally as 200, according to aspects of the various embodiments disclosed herein. The network system 200 includes a utility monitoring system 210, which may be similarly configured in accordance with any of the various optional features disclosed above and below with respect to the utility monitoring system 100 illustrated in FIG. 1. The utility monitoring system 210 contains meter devices 212 coupled together over a peer-to-peer network 214, protection devices, and monitoring software which may be implemented via a host computer 216.

A firewall 220 secures the users internal networks, information, and data from external connections. Third party services, which are collectively designated at 230 in FIG. 4, give functionality for the user to retrieve and/or view information, services, data, etc. The network system 200 exemplified in FIG. 4 also includes manufacturer's application and services, which are collectively designated at 240, that connect with the utility monitoring system 210 to retrieve, store, process, analyze, and/or aggregate data and information. The features provided by the manufacturer's application and services 240 can include, for example, extended storage (or on-line data storage), aggregation services, maximization widget, etc.

A user web interface, which is indicated generally at 250 in FIG. 4, allows a user to interact with the third party services 230 and the utility monitoring system 210 via a standard web browser. The user web interface feature 250 allows for seamless viewing of data from third parties, manufacturer's services, and their utility monitoring system 210 via a standard web interface, which can be made available to via a personal computer, laptop, smart phone, mobile interface, etc.

The network system 200 of FIG. 4 also includes monitoring software that monitors and controls the meter devices and protection relays in the utility monitoring system 210. The monitoring software can be implemented from the utility monitoring system 210 (e.g., from the meter devices 212 or the host computer 216), from the third party services 230, from the manufacturer's application and services 240, or any combination thereof. In some embodiments, the monitoring software communicates with the monitoring devices, acquiring data and further processing, storing and presenting the data to one or more system users. In some embodiments, the monitoring software also allows connection and control of the protection relays and other associated devices on the utility monitoring system 210, and also connects with the manufacturer's applications and services 240 and the user's web browser 250. Connecting many of these components are web services 260, which can be web based applications that provide the data between the required components.

Various aspects of the present concepts include pushing configuration & commissioning data to a hosted site for backup and/or data redundancy. U.S. patent application Ser. No. 12/215,734, which was filed on Jun. 30, 2008, and is entitled "Web Services Enabled Device and Browser Gadgets Coupled with Data Storage Service and Web Portal," and is incorporated herein by reference in its entirety, describes various methods and systems of presenting structured information, via software gadgets, based on monitored data in a utility monitoring system. It also describes how these features can be deployed with minimal requirements of a user's personal computer while providing a robust set of features and supporting the long-term reporting and analysis needs of users. It also describes how a very functional, but entry-level energy monitoring solution can be deployed and supported globally, while only requiring a web browser, a web-enabled device, and an internet connection.

Using FIG. 4 as a point of general reference, the hosted site, which can be provided, for example, via the third party services 230 or the manufacturer's application and services 240, can be used for data redundancy by utilizing the web services 260 and on-line data storage component in 240 as a backup platform for the data. More specifically, the web services can be utilized to act as an aggregator to logged data that may be distributed over several devices. Referring back to FIGS. 2 and 3, simply querying one of the networked devices may not provide all the relevant data requested, as multiple devices may need to be queried to acquire the full data set. On storing the full data set with the on-line data storage, when requests are made through software gadgets, on-board web pages, and/or application software, the device(s) can determine from what other devices to retrieve the data to complete its dataset. The device can then reconstruct the dataset in real-time by appending the data from its own memory and from the memory storage of the other networked devices, based upon its storage plan, to form a single dataset for the requesting application. Alternately, as the memories on some of the networked devices become full, the prospect of having the aggregation being done at the device level is not always available. To obviate this limitation, the request is sent via the web services and may be redirected from device to poll the data from the other networked devices. This allows for real-time aggregation and viewing of data/information via a web-browser from a user.

Figure 5:
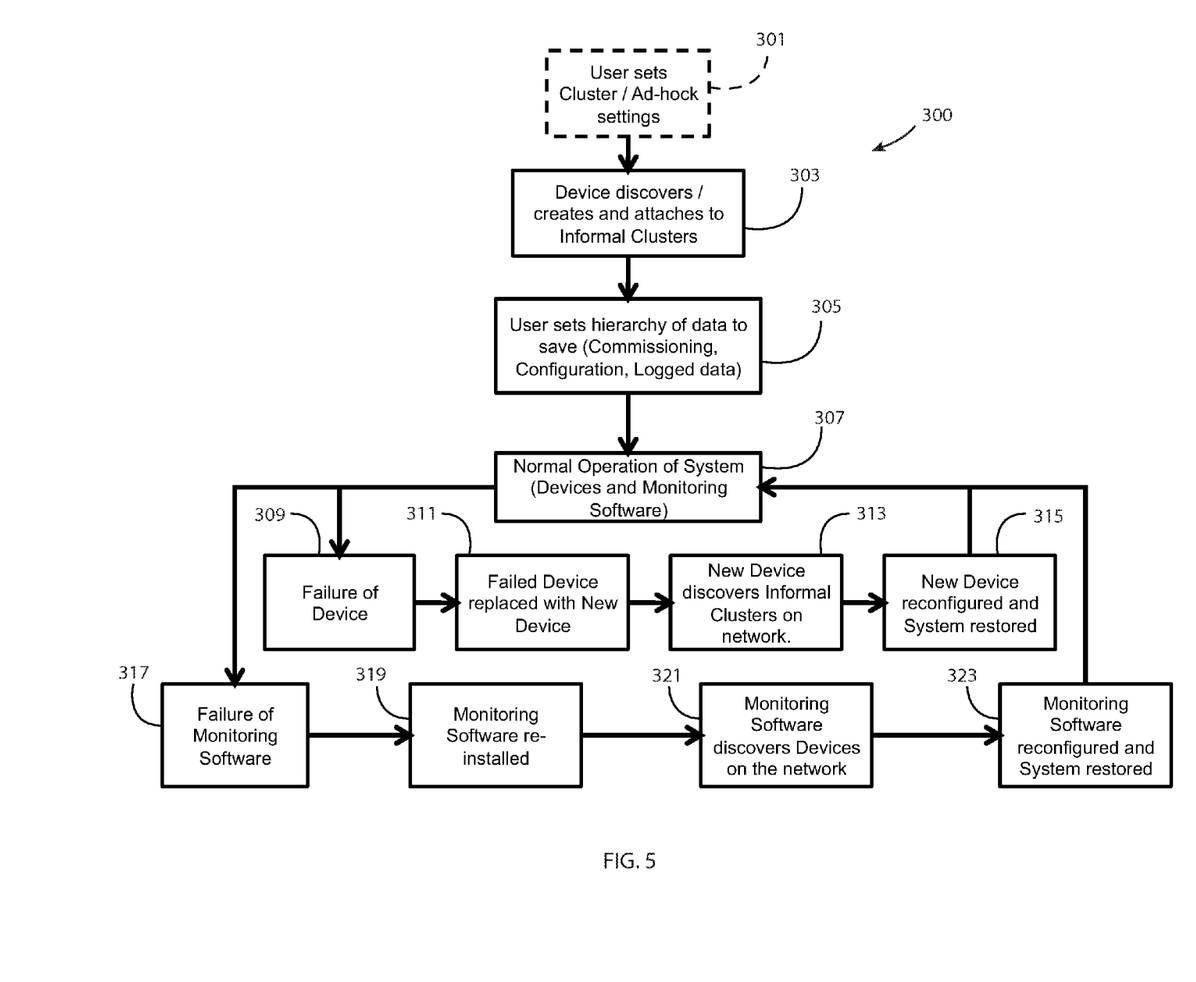
FIG. 5 is a flowchart for an algorithm that corresponds to instructions executed by a controller in accord with at least some aspects of the disclosed concepts.

With reference now to the flow chart of FIG. 5, an improved method 300 for managing information in a utility monitoring system is generally described in accordance with various embodiments of the present disclosure. FIG. 5 represents an exemplary algorithm that corresponds to at least some instructions that may be executed by one or more controllers to perform any or all of the following described functions associated with the disclosed concepts. The instructions corresponding to the algorithm 200 can be stored on a non-transitory computer-readable medium, such as on a hard drive or other mass storage device or a memory device.

The method 300 of FIG. 5 can start at block 301, which is an optional feature whereat the user can configure the "informal cluster" settings. For instance, in some embodiments, the user identifies selected ones of the monitoring devices on the peer-to-peer network that will be associated via a cluster. Alternatively, block 301 can be eliminated and the devices and/or the system can be individually or collectively configured to dynamically determine which of the monitoring devices on the peer-to-peer network will be associated with each cluster, as indicated at block 303. This can be based, for example, on the interconnectivity (i.e., architecture) of the array of peer-to-peer networked devices. As indicated at block 303, each device attaches itself to one or more of the informal clusters. In so doing, the devices are networked together such that each device on the network (and in a cluster) can implement the distributed memory feature described above, for example in FIGS. 1-3, at any point in time during operation of the system.

In some embodiments, the user is provided the option of setting a "hierarchy redundancy of data," as indicated at block 305. A "hierarchy redundancy of data," as noted above, allows the user to designate certain data fields as critical and, optionally, designate certain fields as not critical. As an extension thereof, the user my be enabled to designate the types and/or amounts of information shared between each of the peer-to-peer networked monitoring devices in the cluster.

At block 307, the utility monitoring system is in normal operation mode. As mentioned before, the distributed memory approach may be utilized during normal operation, both with and without connection to the web services. Block 309 indicates that a device failure has occurred. The monitoring software may flag this event; optionally, the devices on the peer-to-peer network can flag this event. At block 311, the failed device is replaced and, at block 313, a new device is installed. Similarly to block 303, when the new device is installed, the device discovers or creates an informal cluster for redundant backup purposes of key data. For example, in the event of a new device, it discovers that one or more clusters of networked devices have been established. The user, the new device, the devices in the cluster, and/or the system then determines which cluster to associate the new device with. Key data is then pushed to the new device at block 315 to initiate its own commissioning & configuration. With key data or information replaced within the new device, the reconfiguration of the new device is automated. Recommissioning also includes the option to retrieve lost data from the failed device that was not sent to the monitoring software or otherwise saved. Alternatively, the new device can retrieve some or all of the lost data/commissioning & configuration data from an offsite data storage and control location, as seen in FIG. 4. Once the new device is properly configured and restored, the system moves back to normal operation at block 307.

At block 317, the monitoring software or associated databases fail, whether planned or unplanned. A reinstallation of the software or associated databases is performed at block 319. Alternatively, new software or new databases are installed at block 319. When the monitoring software/associated databases is reinstalled, the reconfiguration of the new monitoring system is automated. For example, at block 321 the monitoring software searches for and discovers devices on the network (or via web services). These devices are then imported into the monitoring software. At block 323, the monitoring software auto-configures the software settings, system diagrams, etc. This allows for the possibility to restore the system to its original setup (and associated data). This is also where a Single Line Diagram can be generated.

Within any or all of the above blocks, it should be understood that active utilization of web services or other protocol communications can be done at any time. The internet-hosted remote storage system captures data from the devices and makes it available through web-based services for data analysis and reporting. This includes supporting monitoring devices when they are at or above a threshold storage capacity (e.g., 100% memory) or processing capacity but still need a system to help capture and process monitoring or measurement data for the user without losing data.

In some embodiments, the method 300 of FIG. 5 includes at least those blocks enumerated above. It is also within the scope and spirit of the present disclosure to omit blocks, include additional blocks, and/or modify the order of the blocks presented. It should be further noted that the method 300 represents a singly cycle of implementation. However, it is expected that the method 300 be applied in a repetitive and/or systematic manner.

An advantage of the features presented herein include network device replacement can be automated, including the configuration & commissioning process, lost data recovery, and/or system reconfiguration. Another advantage is that users are protected from data loss when a device fails, the monitoring software fails, or external databases fail. In addition, users may also be able to delay communication infrastructure upgrades and read meters slowly or less frequently, knowing the data is protected.

Another advantage is that the value of the individual devices is maximized by leveraging their aggregate storage capabilities; the devices are no longer limited by their individual storage capabilities for their related individual monitoring points. In addition, for offline storage applications, the foregoing features provide a low total cost of ownership solution for basic monitoring by removing the requirement of application software be installed and maintained for data storage and reporting. Moreover, in some of the foregoing embodiments, by some/all of the requisite information in the devices themselves, the monitoring software can build the one-line diagram using this information, which should speed up the process of generating the one-line diagram and reduce errors.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of managing information in a utility monitoring system, the utility monitoring system including a host computer and an array of monitoring devices operatively coupled together on a peer-to-peer network, the array of monitoring devices including at least a first monitoring device with a first memory and a second monitoring device with a second memory, the first and second monitoring devices each being configured to receive data, convert measurements of a characteristic of a utility into corresponding data, and transmit data, the first monitoring device being part of a cluster of the monitoring devices, each of the monitoring devices in the cluster storing therein configuration and commissioning information of the first monitoring device, the method comprising:
   storing data received by the first monitoring device in the first memory;
   storing data received by the second monitoring device in the second memory;
   responsive to the first memory being below a first threshold storage capacity, transferring at least some of the data received by the second monitoring device to the first monitoring device;
   storing the transferred data in the first memory;
   receiving an indication that the first monitoring device has been replaced with a first replacement monitoring device having a first replacement memory, the first replacement monitoring device being configured to receive data, convert measurements of the characteristic of the utility into data, and transmit data;
   transferring the configuration and commissioning information stored in at least one of the monitoring devices in the cluster to the first replacement monitoring device; and
   storing the configuration and commissioning information in the first replacement memory.

2. The method of claim 1, further comprising determining, via the second monitoring device, if the first memory is below the first threshold storage capacity, wherein the transferring is responsive to the second monitoring device determining the first memory is below the first threshold storage capacity.

3. The method of claim 1, further comprising:
   forming the cluster of the networked monitoring devices, the forming including the first replacement monitoring device dynamically associating selected ones of the peer-to-peer networked monitoring devices with the cluster; and
   transferring data between the first monitoring device and at least one other peer-to-peer networked monitoring device in the formed cluster.

4. The method of claim 1, wherein the cluster comprises selected ones of the peer-to-peer networked monitoring devices, the selected ones of the monitoring devices being dynamically determined based at least in part on the interconnectivity of the array of peer-to-peer networked monitoring devices.

5. The method of claim 1, further comprising preconfiguring respective types of information shared between each of the peer-to-peer networked monitoring devices in the cluster.

6. The method of claim 1, further comprising preconfiguring respective amounts of information shared between each of the peer-to-peer networked monitoring devices in the cluster.

7. The method of claim 1, wherein the configuration and commissioning information stored in each of the networked monitoring devices in the cluster includes information representative of a Single Line Diagram of the utility monitoring system.

8. The method of claim 1, wherein the transferred data includes configuration and commissioning information of the second monitoring device, the method further comprising:
   receiving an indication that the second monitoring device has been replaced with a second replacement monitoring device having a second replacement memory, the second replacement monitoring device being configured to receive data, convert measurements of the characteristic of the utility to data, and transmit data;
   transferring the configuration and commissioning information stored in the first memory to the second replacement monitoring device; and
   storing the configuration and commissioning information of the second monitoring device in the second replacement memory.

9. The method of claim 1, further comprising, responsive to the first memory not being below the first threshold storage capacity, storing data subsequently received by the first monitoring device in the second memory.

10. The method of claim 1, further comprising:
    determining if the second memory is at or above a second threshold storage capacity, and, if so, storing data subsequently received by the second monitoring device on the first memory.

11. The method of claim 1, wherein the array of networked monitoring devices further includes a third monitoring device with a third memory, the method further comprising:
    responsive to the first memory not being below the first threshold storage capacity, determining if the third memory is below a third threshold storage capacity;
    if the third memory is below the third threshold storage capacity, transferring at least some of the data stored in the second memory to the third monitoring device; and
    storing the transferred data in the third memory.

12. The method of claim 1, wherein the transferred data includes monitoring information received by the second monitoring device from a sensing device.

13. The method of claim 1, wherein the transferred data is stored based on a first-in-first-out scheme.

14. The method of claim 1, further comprising:
    determining if a triggering event occurred, the triggering event being a precursor to a large amount of data being received by the first monitoring device;
    if the triggering event has occurred, transferring at least some of the large amount of data being received by the first monitoring device to the second monitoring device; and
    storing the transferred at least some of the large amount of data in the second memory.

15. The method of claim 1, wherein the array of networked monitoring devices are linked together in a RAID 3, a RAID 4, or a RAID 5 type-array configuration, or combinations thereof.

16. The method of claim 1, further comprising determining a hierarchy redundancy of data, the hierarchy redundancy of data including at least a set of critical data and a set of non-critical data, wherein, if the first memory is at or above the first threshold storage capacity, the set of critical data is stored on the first monitoring device before the set of non-critical data.

17. The method of claim 1, further comprising:
transferring at least a portion of the data stored in the first memory, the second memory, or both to a host website; and
storing the transferred portion of the data at the host website.

18. One or more non-transitory, machine-readable storage media including instructions which, when executed by one or more processors, cause the one or more processors to perform operations associated with a first monitoring device having a first memory, the first monitoring device being part of a cluster of monitoring devices with a second monitoring device, the operations comprising:
receiving data;
storing the received data in the first memory;
responsive to a second memory within the second monitoring device being below a threshold storage capacity, transferring at least some of the data received by the first monitoring device to the second monitoring device, the first and second monitoring devices being operatively coupled together on a peer-to-peer network, the second monitoring device storing the transferred data in the second memory;
receiving an indication that the second monitoring device has been replaced with a replacement monitoring device having a replacement device memory;
transferring configuration and commissioning information of the second monitoring device stored in the first memory of the first monitoring device to the replacement monitoring device, the replacement monitoring device storing the configuration and commissioning information of the second monitoring device in the replacement device memory.

19. A monitoring system for monitoring usage of at least one utility by a utility consuming system, the monitoring system comprising:
a plurality of monitoring devices each with a respective memory, each of the monitoring devices being configured to receive data, transmit the received data, and store the received data in the respective memory;
a host computer operatively coupled to the plurality of monitoring devices; and
a peer-to-peer network communicatively coupling the plurality of monitoring devices together,
wherein each of the monitoring devices is operable to selectively transfer at least some of the data received thereby to at least one of the other monitoring devices on the peer-to-peer network;
wherein each of the monitoring devices is operable to selectively store in the respective memory at least some data transferred thereto via one of the other monitoring devices on the peer-to-peer network; and
wherein a first one of the monitoring devices is configured to receive an indication that a second one of the monitoring devices has been replaced with a replacement monitoring device having a replacement device memory, and responsively transfer configuration and commissioning information of the second monitoring device stored in a first memory of the first monitoring device to the replacement monitoring device, the replacement monitoring device storing the configuration and commissioning information of the second monitoring device in the replacement device memory.

20. A monitoring device for monitoring one or more characteristics of a utility system, the monitoring device comprising:
a communications interface configured to communicatively couple to a cluster of monitoring devices via a peer-to-peer network such that the monitoring device can receive data from and transmit data to at least a second monitoring device in the cluster of monitoring devices;
a controller;
a memory device storing instructions which, when executed by the processor, cause the monitoring device to:
store configuration and commissioning information of the second monitoring device in the memory device;
receive an indication that the second monitoring device has been replaced with a replacement monitoring device having a replacement device memory;
transfer the configuration and commissioning information of the second monitoring device stored in the memory device to the replacement monitoring device such that the replacement monitoring device stores the configuration and commissioning information of the second monitoring device in the replacement device memory.

21. A utility monitoring system for monitoring at least one utility, the utility monitoring system comprising:
a plurality of monitoring devices each with a respective memory, each of the monitoring devices being configured to receive data, transmit the received data, and store the received data in the respective memory; and
a peer-to-peer network communicatively coupling the plurality of monitoring devices together,
wherein at least a first one of the monitoring devices is configured to:
store configuration and commissioning information of a second one of the monitoring devices in a first memory of the first monitoring device;
receive an indication that the second monitoring device has been replaced with a replacement monitoring device having a replacement device memory; and
responsively transfer configuration and commissioning information of the second monitoring device stored in a first memory of the first monitoring device to the replacement monitoring device, the replacement monitoring device storing the configuration and commissioning information of the second monitoring device in the replacement device memory.

22. The utility monitoring system of claim 21, wherein the first monitoring device is further configured to:
receive data from the replacement monitoring device in response to the first memory being below a first threshold storage capacity; and
store the received data in the first memory.

23. The utility monitoring system of claim 21, wherein the first monitoring device is part of a cluster of the monitoring devices with the second monitoring device.

24. The utility monitoring system of claim 23, wherein the cluster comprises selected ones of the monitoring devices, the selected ones of the monitoring devices being dynamically determined based at least in part on the interconnectivity of the peer-to-peer networked monitoring devices.

25. The utility monitoring system of claim 23, wherein the monitoring devices in the cluster are preconfigured to share therebetween only respective types of information.

26. The utility monitoring system of claim 23, wherein the monitoring devices in the cluster are preconfigured to share therebetween only respective amounts of information.

27. The utility monitoring system of claim 23, wherein each of the monitoring devices in the cluster is configured to store therein configuration and commissioning information for at least one other monitoring device in the cluster.

28. The utility monitoring system of claim 23, wherein each of the monitoring devices in the cluster is configured to store therein information representative of a Single Line Diagram of the utility monitoring system.

* * * * *